United States Patent
Wolafka et al.

(10) Patent No.: US 11,595,401 B2
(45) Date of Patent: Feb. 28, 2023

(54) WORKLOAD SECURITY RINGS

(71) Applicant: Google LLC, Mountain View, CA (US)

(72) Inventors: Rainer Wolafka, Mountain View, CA (US); Aaron Joyner, Mountain View, CA (US); Ken Stillson, Mountain View, CA (US); Michael Czapinski, Zürich (CH)

(73) Assignee: Google LLC, Mountain View, CA (US)

(*) Notice: Subject to any disclaimer, the term of this patent is extended or adjusted under 35 U.S.C. 154(b) by 147 days.

(21) Appl. No.: 17/227,312

(22) Filed: Apr. 10, 2021

(65) Prior Publication Data
US 2022/0329605 A1    Oct. 13, 2022

(51) Int. Cl.
*H04L 9/40* (2022.01)
*G06F 9/50* (2006.01)

(52) U.S. Cl.
CPC ............ *H04L 63/105* (2013.01); *G06F 9/505* (2013.01); *G06F 9/5083* (2013.01); *H04L 63/104* (2013.01); *H04L 63/20* (2013.01)

(58) Field of Classification Search
CPC ..... H04L 63/105; H04L 63/104; H04L 63/20; G06F 9/505; G06F 9/5083; G06F 9/5072; G06F 21/6218; G06F 9/50
USPC .......................................................... 726/26
See application file for complete search history.

(56) References Cited

U.S. PATENT DOCUMENTS

| 2019/0317825 A1* | 10/2019 | O'Neal | G06N 3/08 |
| 2020/0236034 A1* | 7/2020 | Smith | H04L 45/502 |
| 2022/0245255 A1* | 8/2022 | Hinnershitz | G06F 21/64 |

OTHER PUBLICATIONS

Kuanuradha:"Production and Non-production Environments" Oct. 7, 2020.
International Search Report and Written Opinion for PCT/2022/022949.

* cited by examiner

*Primary Examiner* — Noura Zoubair
*Assistant Examiner* — Aubrey H Wyszynski
(74) *Attorney, Agent, or Firm* — Honigman LLP; Brett A. Krueger

(57) ABSTRACT

A method for workload security rings that includes receiving a plurality of workloads, each associated with respective security criteria and scheduled for execution on a distributed computing system divided into a plurality of security rings each associated with a respective subset of computing devices of the distributed computing system that is physically isolated from the other security rings. For each respective workload, the method includes determining, using the respective security criteria, a security level of the respective workload and identifying, using the security level of the respective workload, one or more of the plurality of security rings that are eligible for executing the respective workload. The method also includes executing the respective workload on one or more computing devices selected from one of the respective subsets of computing devices associated with the identified one or more of the plurality of security rings eligible for executing the respective workload.

22 Claims, 7 Drawing Sheets

WORKLOAD SECURITY RINGS

TECHNICAL FIELD

This disclosure relates to workload security rings.

BACKGROUND

Distributed computing networks (i.e., "cloud computing") are increasingly popular due to price, scalability, and flexibility. These computing networks simultaneously manage an incredible number of varying workloads. For instance, some workloads may be experimental, other workloads my process user data, while yet other workloads may process mission critical fleet management information. Each different workload type demands different requirements regarding security, maintainability, and flexibility.

SUMMARY

One aspect of the disclosure provides a computer-implemented method for workload security rings that, when executed by data processing hardware causes the data processing hardware to perform operations. The operations include receiving a plurality of workloads. Each workload is associated with respective security criteria and scheduled for execution on a distributed computing system. The distributed computing system is divided into a plurality of security rings and each security ring of the plurality of security rings is associated with a respective subset of computing devices of the distributed computing system that is physically isolated from the respective subset of computing devices of the distributed computing system associated with each other security ring of the plurality of security rings. For each respective workload of the plurality of workloads, the method includes determining, using the respective security criteria, a security level of the respective workload and identifying, using the security level of the respective workload, one or more of the plurality of security rings that are eligible for executing the respective workload. The method also includes executing the respective workload on one or more computing devices selected from one of the respective subsets of computing devices associated with the identified one or more of the plurality of security rings eligible for executing the respective workload.

Implementations of the disclosure may include one or more of the following optional features. In some implementations, the operations further include, for each security ring in the plurality of security rings, determining resource utilization for the respective subset of computing devices associated with the security ring and adjusting, using the determined resource utilization, a number of computing devices in the respective subset of computing devices associated with the security ring. Optionally, for each security ring in the plurality of security rings, the security ring is associated with a respective security requirement and each computing device in the respective subset of computing devices associated with the security ring complies with the respective security requirement of the security ring.

In some examples, the respective security requirement for each security ring in the plurality of security rings includes a different level of physical security than the respective security requirement for each other security ring in the plurality of security rings. The operations may further include, prior to receiving the plurality of workloads, for each respective computing device of the distributed computing system, obtaining a set of parameters characterizing a security posture of the respective computing device and assigning, using the set of parameters, the respective computing device to one of the plurality of security rings.

In some implementations, the respective security criteria for each respective workload of the plurality of workloads includes a sensitivity of the respective workload. The respective security criteria for each respective workload of the plurality of workloads may include a security posture of the respective workload. In this implementation, the security posture may include an audit of the respective workload.

Optionally, the plurality of security rings include a low-security ring and a high-security ring. In some examples, the determined security level for the respective workload includes one of a low-security level, a middle security level, or a high-security level. When the determined security level for the respective workload includes the low-security level, only the low-security ring may be eligible for executing the respective workload. When the determined security level for the respective workload includes the high-security level, only the high-security ring may be eligible for executing the respective workload. In some examples, when the determined security level for the respective workload includes the middle security level, both the low-security ring and the high-security ring are eligible for executing the respective workload.

Another aspect of the disclosure provides a system for workload security rings that includes data processing hardware and memory hardware in communication with the data processing hardware. The memory hardware stores instructions that when executed on the data processing hardware cause the data processing hardware to perform operations. The operations include receiving a plurality of workloads. Each workload is associated with respective security criteria and scheduled for execution on a distributed computing system. The distributed computing system is divided into a plurality of security rings and each security ring of the plurality of security rings is associated with a respective subset of computing devices of the distributed computing system that is physically isolated from the respective subset of computing devices of the distributed computing system associated with each other security ring of the plurality of security rings. For each respective workload of the plurality of workloads, the method includes determining, using the respective security criteria, a security level of the respective workload and identifying, using the security level of the respective workload, one or more of the plurality of security rings that are eligible for executing the respective workload. The method also includes executing the respective workload on one or more computing devices selected from one of the respective subsets of computing devices associated with the identified one or more of the plurality of security rings eligible for executing the respective workload.

This aspect may include one or more of the following optional features. In some implementations, the operations further include, for each security ring in the plurality of security rings, determining resource utilization for the respective subset of computing devices associated with the security ring and adjusting, using the determined resource utilization, a number of computing devices in the respective subset of computing devices associated with the security ring. Optionally, for each security ring in the plurality of security rings, the security ring is associated with a respective security requirement and each computing device in the respective subset of computing devices associated with the security ring complies with the respective security requirement of the security ring.

In some examples, the respective security requirement for each security ring in the plurality of security rings includes a different level of physical security than the respective security requirement for each other security ring in the plurality of security rings. The operations may further include, prior to receiving the plurality of workloads, for each respective computing device of the distributed computing system, obtaining a set of parameters characterizing a security posture of the respective computing device and assigning, using the set of parameters, the respective computing device to one of the plurality of security rings.

In some implementations, the respective security criteria for each respective workload of the plurality of workloads includes a sensitivity of the respective workload. The respective security criteria for each respective workload of the plurality of workloads may include a security posture of the respective workload. In this implementation, the security posture may include an audit of the respective workload.

Optionally, the plurality of security rings include a low-security ring and a high-security ring. In some examples, the determined security level for the respective workload includes one of a low-security level, a middle security level, or a high-security level. When the determined security level for the respective workload includes the low-security level, only the low-security ring may be eligible for executing the respective workload. When the determined security level for the respective workload includes the high-security level, only the high-security ring may be eligible for executing the respective workload. In some examples, when the determined security level for the respective workload includes the middle security level, both the low-security ring and the high-security ring are eligible for executing the respective workload.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As distributed computing networks (commonly referred to as "cloud computing") are increasingly used for a wide variety of workloads, it becomes more and more important to isolate some workloads from others. For example, some workloads may be experimental and prone to instability and/or attacks while other workloads may include highly sensitive user data. It is undesirable to co-schedule such workloads. However, current software isolation solutions are inadequate for a variety of attacks (e.g., software attacks, zero day attacks, kernel attacks, compromised credentials, etc.). Once a machine is compromised, all workloads executing on that machine are susceptible. However, conventional physical isolation techniques suffer from poor resource utilization, and thus, fail to provide the scalability necessary for modern distributed computing networks.

Some workloads require elevated security. This elevated security may impose requirements such as prevention of other workloads from running on the same machine (i.e., isolation) or usage of special hardware components (e.g., dedicated cryptographic hardware). These workloads may require special means of security hardening and demand special access restrictions (e.g., denying certain protocol connections to the machine such as Secure Shell (SSH)) or special maintenance requirements. In a typical distributed computing system, a workload may be assigned to any computing device with capacity and thus may be co-scheduled with unsafe or high risk workloads. A common solution to this problem is assigning sensitive workloads to execute on a computing device alone, however, this technique fails to offer any sort of scaling as it provides very poor utilization rate as the computing device typically can execute a number of workloads and is instead limited to executing only a single workload.

Implementations herein are directed toward a distributed processing or computing system or network that includes a plurality of workload security rings. Each computing device of the distributed processing system is assigned to one of the security rings. Each computing device of each security rings is physically isolated from computing devices of different security rings. A security ring controller determines a security level of each workload destined for execution on the distributed processing system. Based on the determined security level, the workload executes on one of the security rings eligible to execute the workload.

Figure 1:
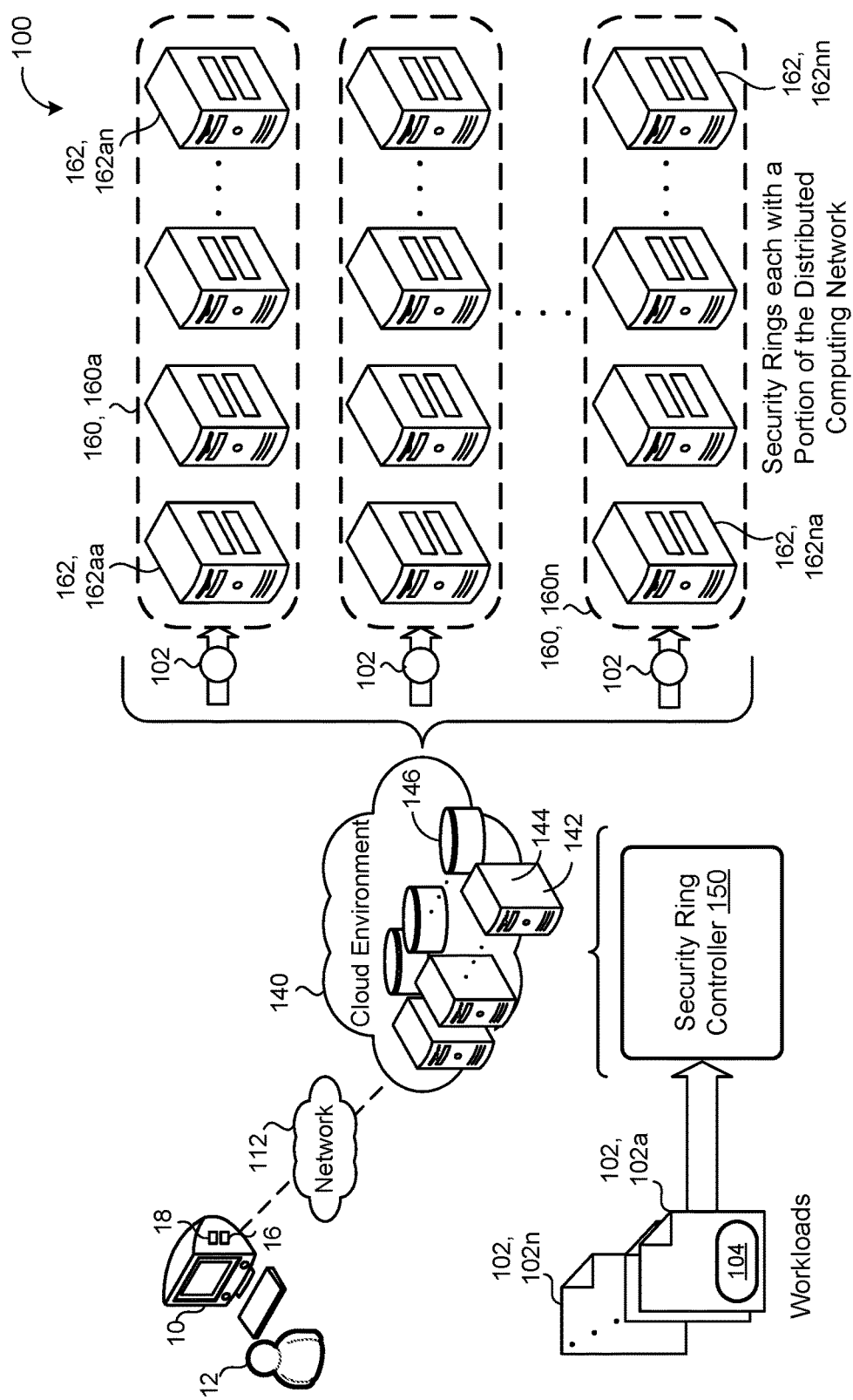
FIG. 1 is a schematic view of an example system for implementing workload security rings.

Referring to FIG. 1, in some implementations, an example system 100 may include a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 includes a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The distributed system is divided into a plurality of security rings 160, 160a—n with each security ring 160 including a subset of computing devices 162, 162aa-162nn. That is, the remote system 140 includes a plurality of computing devices 162 that are each assigned to one of the security rings 160. The remote system 140 may include any number of security rings 160 that each include any number of computing devices 162. Each computing device 162 includes computing resources and memory resources necessary to execute workloads 102, 102a—n. Each workload 102 represents a processing task to be executed on one or more computing devices 162 within the same security ring 160. In some examples, the workloads 102 are received from the user device 10 or other remote devices (e.g., servers). In other examples, the workloads 102 originate from the remote system 140. The workloads 102 may include any sort of processing task, such as a software application.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Each computing device 162 is assigned or associated with a single security ring 160 such that each security ring 160 is associated with a respective subset of computing devices 162 of the distributed computing network of the remote system 140. In some examples, each security ring 160 is associated with a respective subset of computing devices 162 of the remote system 140 that is physically isolated from the respective subset of computing devices 162 of the remote system 140 associated with each other security ring 160. For example, each computing device 162 of a particular security ring 160 is located within a server that is physically isolated from each computing device 162 of the other security rings 160. Put another way, two computing devices 162 assigned to two different security rings 160 cannot share the same physical device (e.g., server). Additional isolation techniques may be used to further separate the security rings 160 (e.g., network isolation, power isolation, etc.).

The remote system 140 executes a security ring controller 150. The security ring controller 150 receives the workloads 102 (e.g., from the user 12) and associated security criteria 104. As discussed in more detail below, the security criteria 104 associated with each workload 102 includes information relating to a security posture of the workload 102 (i.e., how secure the workload 102 is) and/or a sensitivity of the workload 102 (i.e., how critical or sensitive the workload 102 and/or the data the workload 102 processes is). The security ring controller 150, for each workload 102 to be executed on the computing devices 162 of the security rings 160, determines a security level 410 (FIG. 4) of the respective workload 102 using the associated security criteria 104. The security ring controller 150 identifies, using the security level 410 of the respective workload 102, one or more of the plurality of security rings 160 that are eligible for executing the respective workload 102.

That is, in some implementations, each security ring 160 (i.e., the computing devices 162 that are assigned to the respective security ring 160) is eligible to execute workloads 102 assigned one or more particular security levels 410. In one example, the remote system 140 may include three different security rings 160 and each security ring 160 may be eligible to execute one of three different security levels 410. As discussed in more detail with regards to FIG. 4, in other examples, a security ring 160 is eligible to execute workloads 102 assigned to two or more different security levels 410.

After the security ring controller 150 identifies or determines the security level 410 for a given workload 102, the given workload 102 may then execute on one or more of the computing devices 162 eligible to execute workloads 102 with the identified security level 410. In this way, each computing device 162 only executes workloads 102 that correspond to security levels 410 that the computing device 162 is eligible to execute and workloads 102 only share computing devices 162 (i.e., execute simultaneously) with other workloads 102 that have an appropriate security level 410. Thus, the security ring controller 150 may split a large number of workloads 102 into multiple different security equivalence classes (i.e., security levels 410) and isolate each class at machine boundaries (i.e., physically isolated computing devices 162). In this way, the workload security rings 160 address typical isolation threats (e.g., hardware and software exploits and denial-of-service attacks) by limiting the "blast radius" of potential attacks.

Figure 2A:
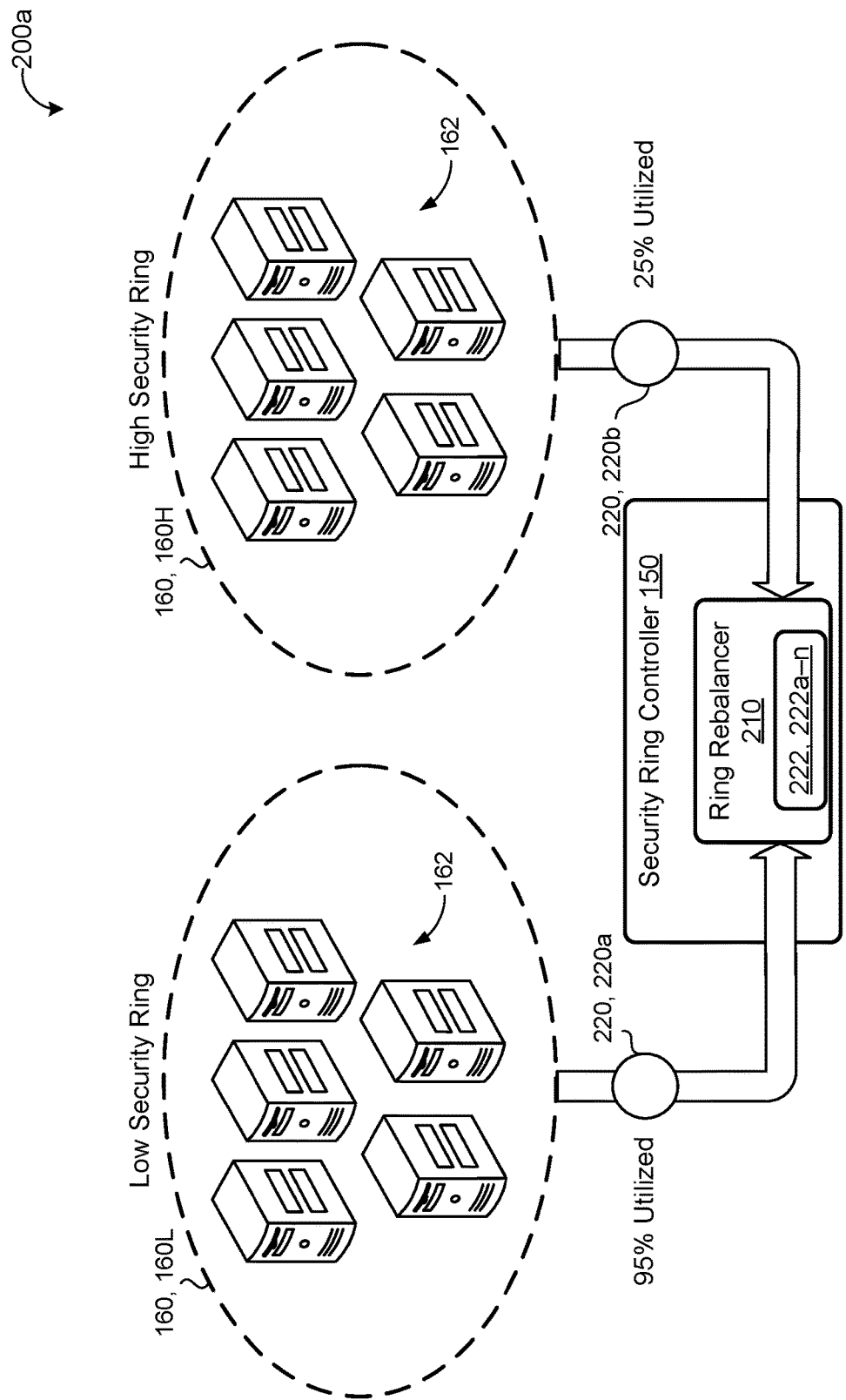
FIGS. 2A and 2B are schematic views of rebalancing the security rings of FIG. 1.
Figure 2B:
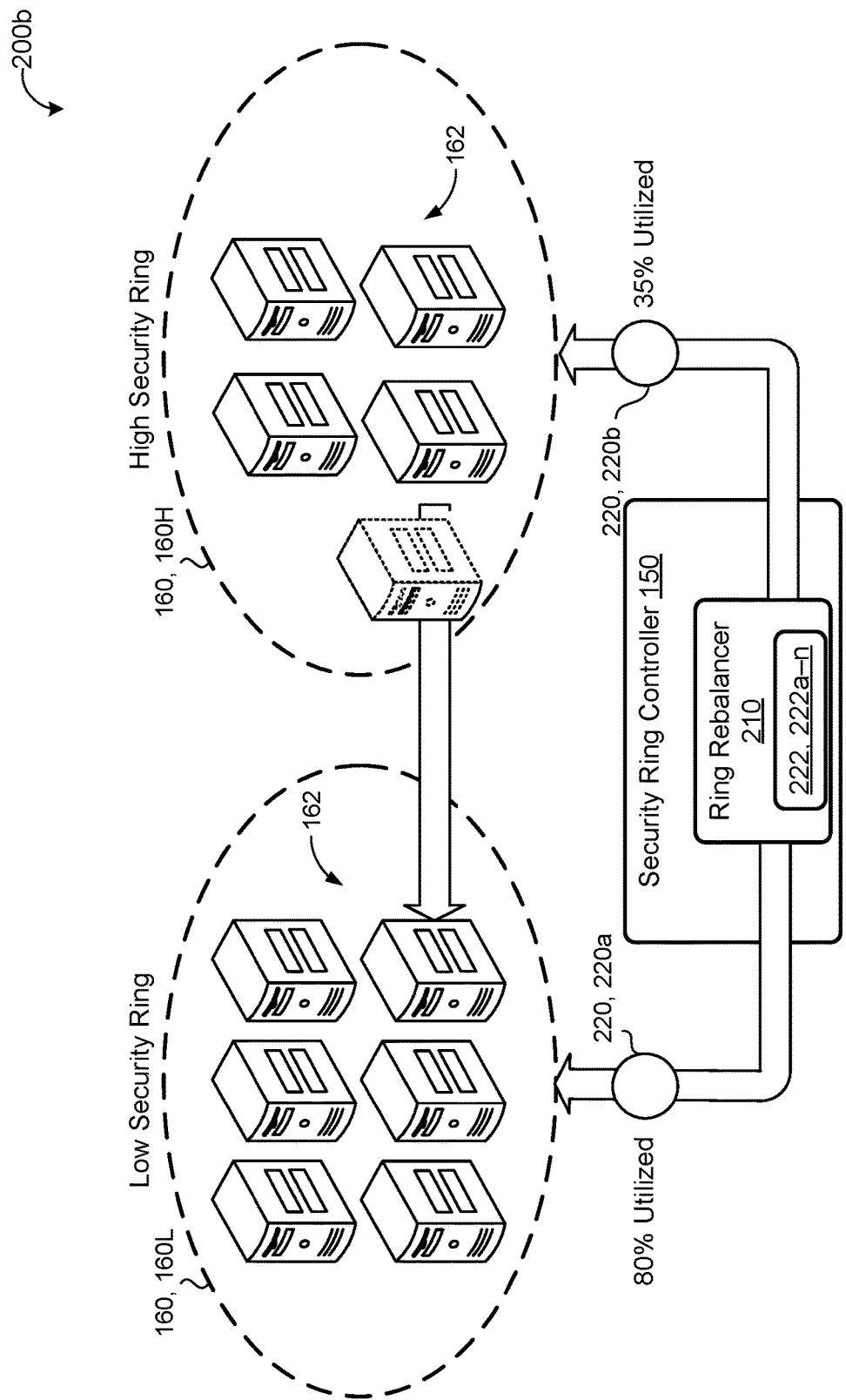

Referring now to FIGS. 2A and 2B, in some implementations, the security ring controller 150 includes a ring rebalancer 210. From each workload security ring 160, the ring rebalancer 210 receives respective resource statistics 220, 220a—n and, using the resource statistics 220, determines a resource utilization 222, 222a—n for each workload security ring 160. Using the determined resource utilizations 222, the ring rebalancer 210 may adjust a number of computing devices 162 in one or more of the security rings 160 (i.e., adjust the number of computing devices 162 in the subset of computing devices 162 associated with a particular security ring 160). In the specific example of FIG. 2A, schematic view 200a shows a low-security ring 160, 160L and a high-security ring 160, 160H, although it is understood that the remote system 140 may include any number of security rings 160. Here, each security ring 160L, 160H includes five computing devices 162. The low-security ring 160L (with five computing devices 162) is operating at 95% capacity and the high-security ring 160H (with a different five computing devices 162) is operating at 25% capacity. That is, the low-security ring 160L is operating at a high percentage of utilization (i.e., cannot easily execute additional workloads 100) while the high-security ring 160H is operating at a low percentage of utilization (i.e., can easily execute additional workloads 100).

Referring now to FIG. 2B, schematic view 200b shows the ring rebalancer 210 reassigning one of the computing devices 162 from the high-security ring 160H to the low-security ring 160L. After adjusting or reassigning the computing device 162 from the high-security ring 160H to the low-security ring 160L, the high-security ring 160H has four computing devices 162 (from the original five) and the low-security ring 160L has six computing devices 162 (from the original five). This rebalancing results in updated resource statistics 220 that indicate that the low-security ring 160L has a utilization rate of 80% and the high-security ring 160H has a utilization rate of 35%. Thus, the security ring controller 150 may dynamically adjust and/or reassign computing devices 162 from one security ring 160 to a different security ring 160 based on resource statistics 220. For example, when a large number of workloads 102 are scheduled to execute on a particular security ring 160, the security ring controller 150 may automatically reassign additional computing devices 162 to the particular security ring 160 to manage the increase in resource need.

The security ring controller 150 may take steps to ensure that reassigned computing devices 162 are properly sanitized prior to switching to the newly assigned security ring 160. For example, the security ring controller 150 may perform memory wipes, reinstallations, and/or other procedures to ensure that no remnants of prior workloads 102 exist on the computing device 162 to ensure the isolation between the security rings 160.

Figure 3:
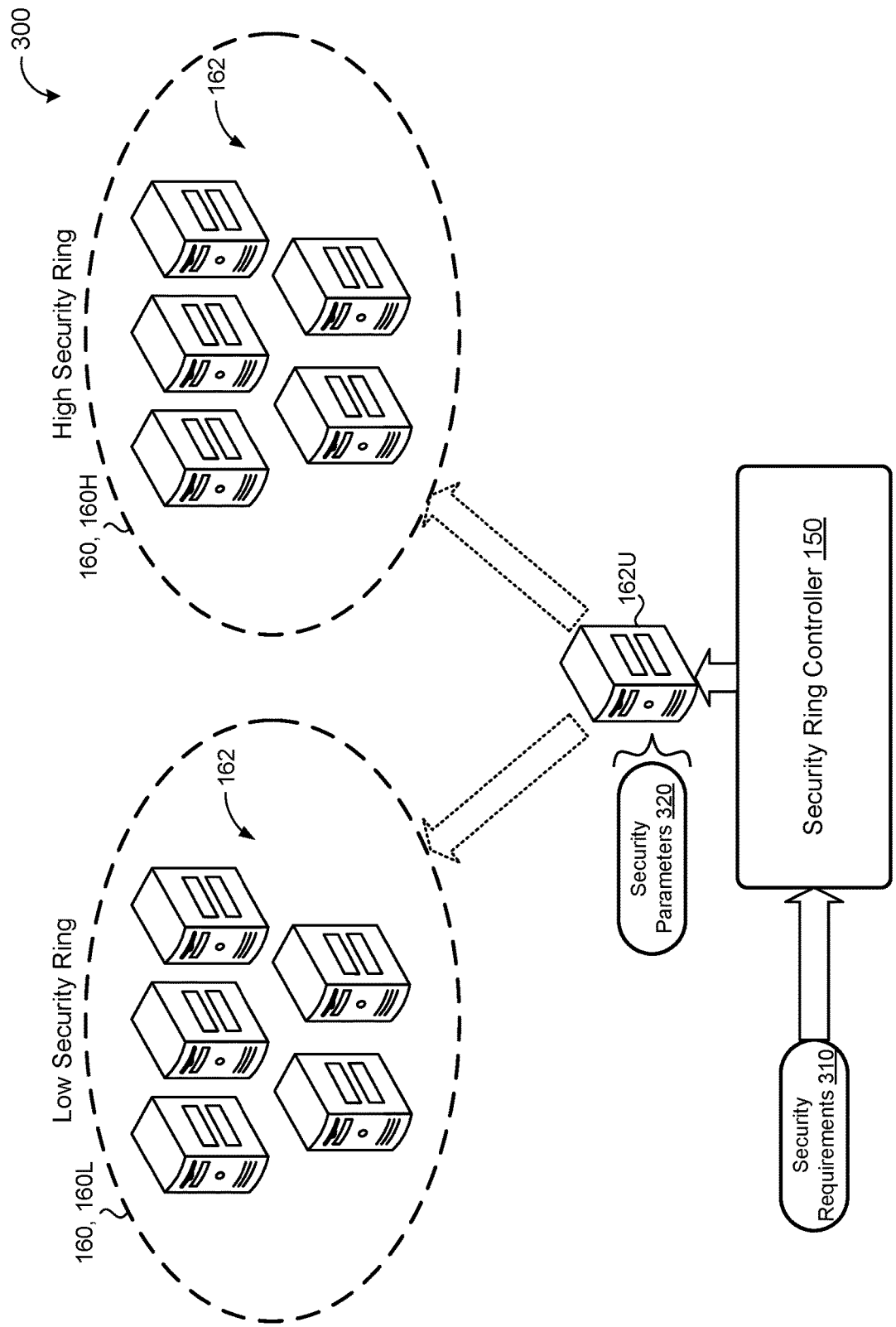
FIG. 3 is a schematic view of assigning computing devices to the security rings.

Referring now to FIG. 3, in some implementations, each security ring 160 is associated with respective security requirements 310 and each computing device 162 in the respective subset of computing devices 162 of each security ring 160 complies with the respective security requirement 310 of the respective security ring 160. For example, schematic view 300 includes the high-security ring 160H and the low-security ring 160L. Based on the security requirements 310 and security parameters 320 of an unassigned computing device 162U, the security ring controller 150 may determine which security ring 160L, 160H to assign the unassigned computing device 162U. The respective security requirement 310 for each security ring 160 may include a different level of physical security than the respective security requirement 310 for each other security ring 160. For example, the high-security ring 160H may have security requirements 310 that require that assigned computing devices 162 have certain physical security characteristics such as a secure geographical location, a secure facility (e.g., in a locked room or case, security surveillance, etc.), or specific hardware. The security requirements 310 may include software requirements as well, such as types of software, versions of software, etc. Put another way, the security requirements 310 may define a minimum threshold of security in a number of different categories required for a computing device 162 to be eligible to execute workloads 102 for a respective security ring 160.

A computing device 162 may be eligible to be assigned to multiple security rings 160. For example, a highly secure computing device 162 may meet the security requirements 310 of the high-security ring 160H and the low-security ring 160L and may be assigned to either security ring 160 based on other factors (e.g., resource utilization). The ring rebalancer 210 (FIGS. 2A and 2B), in some examples, only reassigns computing devices 162 to different security rings 160 that are eligible (based on the security requirements 310 and the security parameters 320) for multiple security rings 160. Thus, in some implementations, prior to receiving the plurality of workloads 102, for each respective computing device 162 of the remote system 140, the security ring controller 150 obtains the security parameters 320 characterizing a security posture of the respective computing device 162. The security ring controller 150 assigns, using the security parameters 320, the respective computing device 162 to one of the plurality of security rings 160.

The security criteria 104 for each workload 102 may include a sensitivity of the workload 102. That is, the security criteria 104 may include parameters that indicate how damaging an attack or loss of the workload 102 may be. For example, a workload 102 that processes important data (e.g., user data, government data, etc.) may be very sensitive while a workload 102 that processes less important data (e.g., weather data) may not be very sensitive. The security ring 160 selected for a respective workload 102 may be at least partially dependent on the sensitivity. For example, a sensitive workload 102 may be more likely to execute on a more secure security ring 160 (e.g., more physical security, hardware security, software security, etc.) than a non-sensitive workload 102. However, due to a variety of factors (e.g., current utilization), a workload 102 with a low sensitivity may still execute on a higher security ring 160. For example, when a low-security ring 160 is fully utilized but a high-security ring 160 has capacity, a non-sensitive workload 102 may be assigned to the high-security ring 160. The sensitivity of the workload may be defined by an owner of the workload and/or determined automatically by the security ring controller 150 and/or determined by a third-party. For example, the owner may set one or more flags or parameters when compiling or transmitting the workload 102 to the security ring controller 150.

In some implementations, assignment of the workload is alternatively or additionally dependent on the security posture of the workload 102. The security posture of the workload 102 represents a level of confidence in the security of the workload 102 itself. That is, the security posture may reflect a confidence in the likelihood of the workload 102 affecting other workloads 102. For example, an experimental workload 102 has a security posture that indicates less security than a production workload 102 because an experimental workload 102 is more likely to crash and/or negatively affect other workloads 102 executing on the same computing device 162. Many parameters may help define the security posture of a workload 102. For instance, when and how the workload 102 was built (i.e., compiled), the author of the workload 102, and the origins of the workload 102 may all affect the security posture. In some implementations, the security posture includes one or more audits or reviews (e.g., by a third party) of the respective workload 102. For example, a workload 102 that has been audited by one or more entities may have a more secure security posture than a workload 102 that has no audits.

In some examples, the security posture affects which security rings 160 the workload 102 is eligible to execute on. For example, a workload 102 with a poor security posture (i.e., is more likely to negatively affect other workloads 102) may not be allowed to execute on a high-security ring 160 even if the workload 102 has a high sensitivity. For example, a workload 102 that was not compiled in a secure environment may process user data, and thus have a high sensitivity that otherwise would qualify to execute on a high-security ring 160 may be restricted from executing on the high-security ring 160 due to the risk the workload 102 poses to the other sensitive workloads 102 executing on the high-security ring 160. Thus, in some examples, the security rings 160 that are eligible to execute a particular workload 102 is dependent on both the sensitivity of the workload 102 and the security posture of the workload 102.

Figure 4:
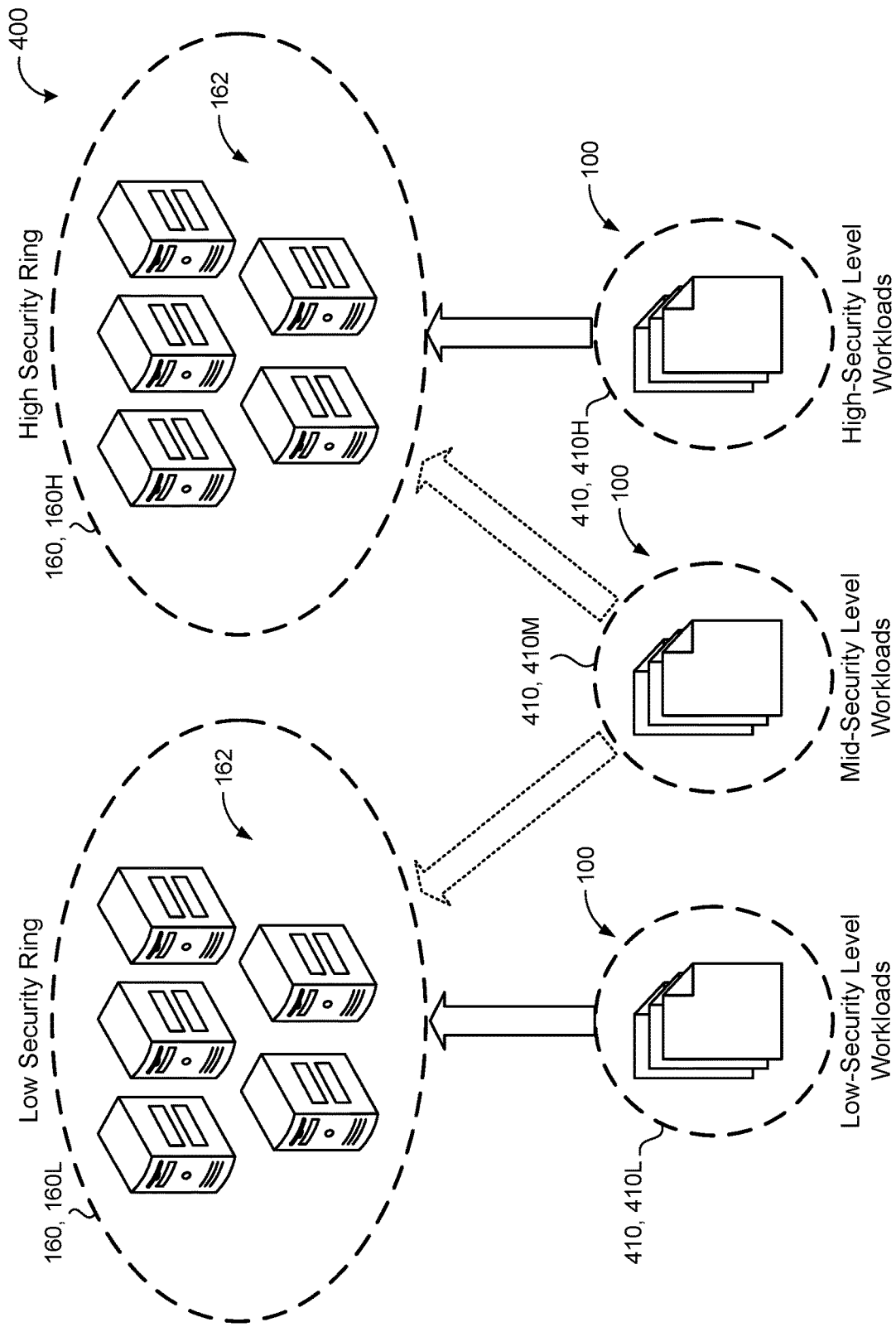
FIG. 4 is a schematic view of assigning workloads to security rings of the system of FIG. 1.

Referring now to FIG. 4, schematic view 400 includes the low-security ring 160L and the high-security ring 160H. In some examples, these two are the only security rings 160. Optionally, the workloads 102 are assigned one of three security levels 410: a low-security level 410L, a mid-security level 410M, or a high-security level 410H. In this example, when the determined security level 410 for the respective workload 102 is the low-security level 410L, only the low-security ring 160L is eligible for executing the respective workload 102. Similarly, when the determined security level 410 for the respective workload 102 is the high-security level 410H, only the high-security ring 160H is eligible for executing the respective workload 102. When the determined security level 410 for the respective workload 102 is the mid-security level 410M, both the low-security ring and the high-security ring are eligible for executing the respective workload 102. Thus, low-security workloads 102 must execute on the low-security ring 160L and high-security workloads 102 must execute on the high-security ring 160H, but mid-security workloads 102 may execute on either the low-security ring 160L or the high-security ring 160H. This allows the security ring controller 150 to maintain a high utilization rate by dynamically assigning mid-security level workloads 102 to either the low-security ring 160L or the high-security ring 160H (i.e., to the computing devices 162 assigned to the respective security rings 160) as the situation warrants.

The low-security workloads 102 may represent unhardened workloads 102 that have not taken the necessary precautions to be considered safe while high-security workloads 102 may represent hardened workloads 102 that have taken the necessary precautions to be considered safe and also include sensitive data. The mid-security workloads 102 may be hardened but do not include sensitive data and thus may execute on either security ring 160. In some implementations, the security ring controller may ensure that unhardened workloads 102 (i.e., low-security workloads 102) that include sensitive data do not co-schedule on the same computing device as other unhardened workloads 102 with sensitive data.

Figure 5:
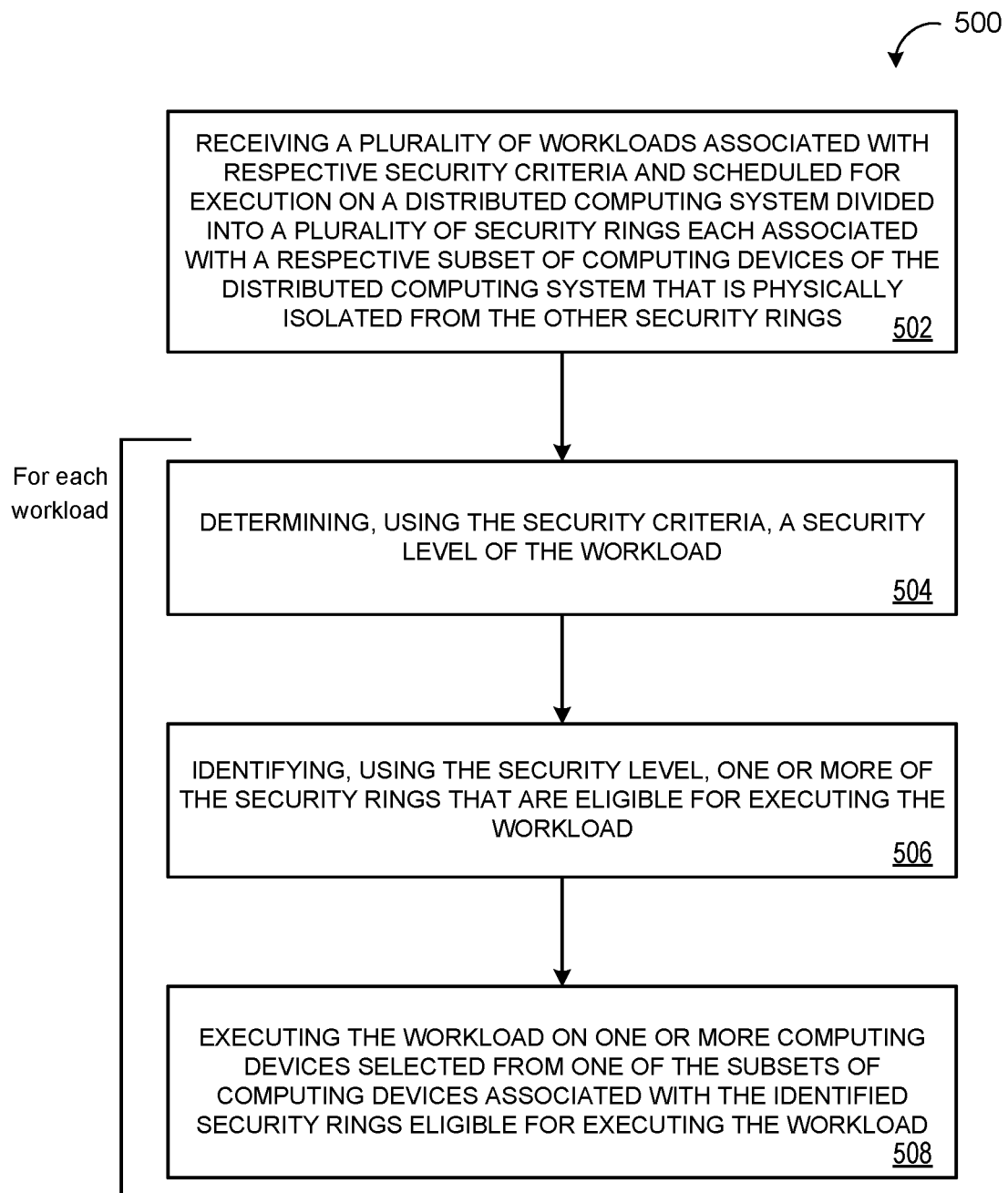
FIG. 5 is a flowchart of an example arrangement of operations for a method of implementing workload security rings.

FIG. 5 is a flowchart of an exemplary arrangement of operations for a method 500 of providing workload security rings. The computer-implemented method 500, when executed by data processing hardware 144 causes the data processing hardware 144 to perform operations. At operation 502, the method 500 includes receiving a plurality of workloads 102. Each workload 102 is associated with respective security criteria 104 and scheduled for execution on a distributed computing system 140. The distributed computing system 140 is divided into a plurality of security rings 160. Each security ring 160 of the plurality of security rings 160 is associated with a respective subset of computing devices 162 of the distributed computing system 140 that is physically isolated from the respective subset of computing devices 162 of the distributed computing system 140 associated with each other security ring 160 of the plurality of security rings 160.

For each respective workload of the plurality of workloads, at operation 504, the method 500 includes determining, using the respective security criteria 104, a security level 410 of the respective workload 102. At operation 506, the method 500 includes identifying, using the security level 410 of the respective workload 102, one or more of the plurality of security rings 160 that are eligible for executing the respective workload 102. The method 500, at operation 508, includes executing the respective workload 102 on one or more computing devices 162 selected from one of the respective subsets of computing devices 162 associated with the identified one or more of the plurality of security rings 160 eligible for executing the respective workload 102.

Thus, the implementations described herein provide automated security ring balancing with a minimal impact on workload scheduling and computing device utilization and efficiency while also minimizing maintenance costs. The security ring controller partitions a distributed computing network into a plurality of security rings that are isolated at the machine boundary. The security ring controller divides workloads into different security equivalence classes in order to ensure isolation between more secure and sensitive workloads from less secure and/or sensitive workloads. The workload security rings provide a level of abstraction to workload isolation that prevents requiring a large number of specific profiles and configuration permutations to execute the workloads and provides flexibility by allowing computing devices to change security rings. The flexibility also allows for phasing out of outdated hardware or the introduction of new hardware easily and seamlessly. The security posture of the security rings may be adjusted (e.g., by adding or removing security requirements) without any action required by the owners of the workloads (i.e., to adjust configuration).

Figure 6:
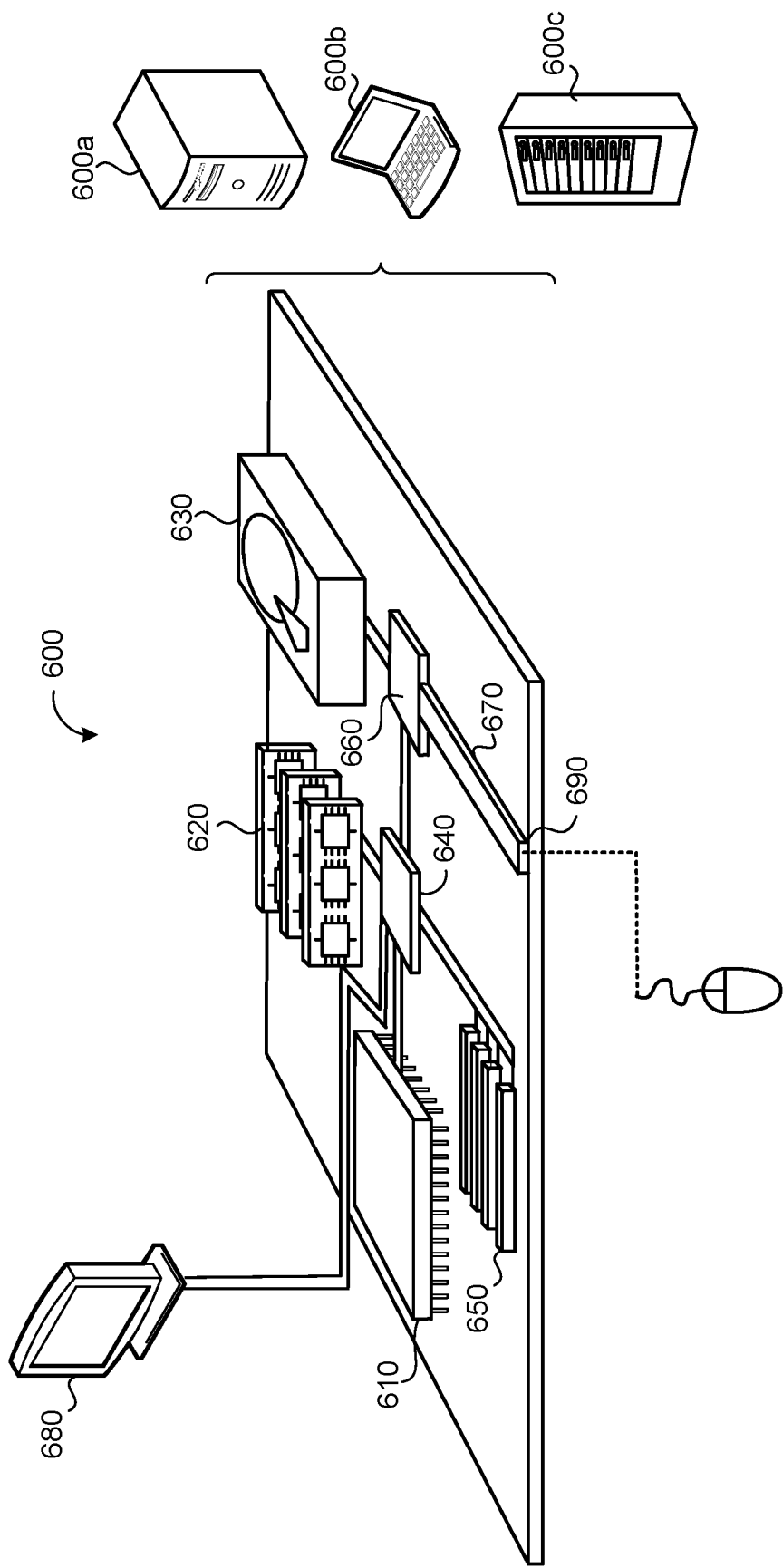
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a plurality of workloads, each workload associated with respective security criteria and scheduled for execution on a distributed computing system, the distributed computing system divided into a plurality of security rings, each security ring of the plurality of security rings associated with a respective subset of computing devices of the distributed computing system that is physically isolated from the respective subset of computing devices of the distributed computing system associated with each other security ring of the plurality of security rings; and
   for each respective workload of the plurality of workloads:
      determining, using the respective security criteria, a security level of the respective workload;
      identifying, using the security level of the respective workload, one or more of the plurality of security rings that are eligible for executing the respective workload; and
      executing the respective workload on one or more computing devices selected from one of the respective subsets of computing devices associated with the identified one or more of the plurality of security rings eligible for executing the respective workload.

2. The method of claim 1, wherein the operations further comprise, for each security ring in the plurality of security rings:
   determining resource utilization for the respective subset of computing devices associated with the security ring; and
   adjusting, using the determined resource utilization, a number of computing devices in the respective subset of computing devices associated with the security ring.

3. The method of claim 1, wherein, for each security ring in the plurality of security rings:

the security ring is associated with a respective security requirement; and each computing device in the respective subset of computing devices associated with the security ring complies with the respective security requirement of the security ring.

4. The method of claim 3, wherein the respective security requirement for each security ring in the plurality of security rings comprises a different level of physical security than the respective security requirement for each other security ring in the plurality of security rings.

5. The method of claim 1, wherein the operations further comprise, prior to receiving the plurality of workloads, for each respective computing device of the distributed computing system:

obtaining a set of parameters characterizing a security posture of the respective computing device; and assigning, using the set of parameters, the respective computing device to one of the plurality of security rings.

6. The method of claim 1, wherein the respective security criteria for each respective workload of the plurality of workloads comprises a sensitivity of the respective workload.

7. The method of claim 1, wherein the respective security criteria for each respective workload of the plurality of workloads comprises a security posture of the respective workload.

8. The method of claim 7, wherein the security posture comprises an audit of the respective workload.

9. The method of claim 1, wherein the plurality of security rings comprise a low-security ring and a high-security ring.

10. The method of claim 9, wherein the determined security level for the respective workload comprises one of a low-security level, a middle security level, or a high-security level.

11. The method of claim 10, wherein:

when the determined security level for the respective workload comprises the low-security level, only the low-security ring is eligible for executing the respective workload;

when the determined security level for the respective workload comprises the high-security level, only the high-security ring is eligible for executing the respective workload; and when the determined security level for the respective workload comprises the middle security level, both the low-security ring and the high-security ring are eligible for executing the respective workload.

12. A system comprising:

data processing hardware; and memory hardware in communication with the data processing hardware, the memory hardware storing instructions that when executed on the data processing hardware cause the data processing hardware to perform operations comprising:

receiving a plurality of workloads, each workload associated with respective security criteria and scheduled for execution on a distributed computing system, the distributed computing system divided into a plurality of security rings, each security ring of the plurality of security rings associated with a respective subset of computing devices of the distributed computing system that is physically isolated from the respective subset of computing devices of the distributed computing system associated with each other security ring of the plurality of security rings; and for each respective workload of the plurality of workloads:

determining, using the respective security criteria, a security level of the respective workload;

identifying, using the security level of the respective workload, one or more of the plurality of security rings that are eligible for executing the respective workload; and executing the respective workload on one or more computing devices selected from one of the respective subsets of computing devices associated with the identified one or more of the plurality of security rings eligible for executing the respective workload.

13. The system of claim 12, wherein the operations further comprise, for each security ring in the plurality of security rings:

determining resource utilization for the respective subset of computing devices associated with the security ring; and adjusting, using the determined resource utilization, a number of computing devices in the respective subset of computing devices associated with the security ring.

14. The system of claim 12, wherein, for each security ring in the plurality of security rings:

the security ring is associated with a respective security requirement; and each computing device in the respective subset of computing devices associated with the security ring complies with the respective security requirement of the security ring.

15. The system of claim 14, wherein the respective security requirement for each security ring in the plurality of security rings comprises a different level of physical security than the respective security requirement for each other security ring in the plurality of security rings.

16. The system of claim 12, wherein the operations further comprise, prior to receiving the plurality of workloads, for each respective computing device of the distributed computing system:

obtaining a set of parameters characterizing a security posture of the respective computing device; and assigning, using the set of parameters, the respective computing device to one of the plurality of security rings.

17. The system of claim 12, wherein the respective security criteria for each respective workload of the plurality of workloads comprises a sensitivity of the respective workload.

18. The system of claim 12, wherein the respective security criteria for each respective workload of the plurality of workloads comprises a security posture of the respective workload.

19. The system of claim 18, wherein the security posture comprises an audit of the respective workload.

20. The system of claim 12, wherein the plurality of security rings comprise a low-security ring and a high-security ring.

21. The system of claim 20, wherein the determined security level for the respective workload comprises one of a low-security level, a middle security level, or a high-security level.

22. The system of claim 21, wherein:

when the determined security level for the respective workload comprises the low-security level, only the low-security ring is eligible for executing the respective workload;

when the determined security level for the respective workload comprises the high-security level, only the high-security ring is eligible for executing the respective workload; and when the determined security level for the respective workload comprises the middle security level, both the low-security ring and the high-security ring are eligible for executing the respective workload.

\* \* \* \* \*